United States Patent
McElroy et al.

(10) Patent No.: US 6,329,090 B1
(45) Date of Patent: Dec. 11, 2001

(54) ENTHALPY RECOVERY FUEL CELL SYSTEM

(75) Inventors: James F. McElroy, Suffield, CT (US); James H. Kralick, Albany, NY (US)

(73) Assignee: Plug Power LLC, Latham, NY (US)

( * ) Notice: Subject to any disclaimer, the term of this patent is extended or adjusted under 35 U.S.C. 154(b) by 0 days.

(21) Appl. No.: 09/389,958

(22) Filed: Sep. 3, 1999

(51) Int. Cl.⁷ .................................................. H01M 8/04
(52) U.S. Cl. ............................... 429/13; 429/24; 429/26; 429/34
(58) Field of Search .................... 429/13, 24, 26, 429/34

(56) References Cited

U.S. PATENT DOCUMENTS

| | | | |
|---|---|---|---|
| 4,530,886 | 7/1985 | Sederquist | 429/13 |
| 4,533,607 * | 8/1985 | Sederquist | 429/13 |
| 5,260,143 | 11/1993 | Voss et al. | 429/13 |
| 5,382,478 * | 1/1995 | Chow et al. | 429/26 |
| 5,432,020 | 7/1995 | Fleck | 429/13 |
| 5,441,819 | 8/1995 | Voss et al. | 429/13 |
| 5,543,238 | 8/1996 | Strasser | 429/17 |
| 5,547,776 | 8/1996 | Fletcher et al. | 429/13 |
| 5,773,160 | 6/1998 | Wilkinson et al. | 429/13 |
| 5,786,104 | 7/1998 | Black et al. | 429/13 |
| 5,840,438 * | 11/1998 | Johnson et al. | 429/34 X |
| 6,007,931 | 12/1999 | Fuller et al. | 429/13 |
| 6,013,385 | 1/2000 | DuBose | 429/17 |
| 6,042,956 * | 3/2000 | Lenel | 429/26 X |
| 6,080,502 * | 6/2000 | Nölscher et al. | 429/34 |

FOREIGN PATENT DOCUMENTS

| | | |
|---|---|---|
| 2139110 | 5/1987 | (GB) . |
| WO 99/05741 | 2/1999 | (WO) . |

* cited by examiner

*Primary Examiner*—Stephen Kalafut
(74) *Attorney, Agent, or Firm*—Fish & Richardson P.C.

(57) ABSTRACT

The invention relates to an enthalpy recovery fuel cell system. Water leaving the fuel cell in the cathode gas output stream is transferred to the cathode gas input stream. The dew point of the input stream of the cathode gas is about the same as the temperature of the leading edge of the active area of the solid electrolyte, such as a proton exchange membrane. The temperature differential across the fuel cell is about the same as the difference in the dew points of the cathode gas entering the fuel cell and the cathode gas exiting the fuel cell.

35 Claims, 6 Drawing Sheets

ENTHALPY RECOVERY FUEL CELL SYSTEM

The invention relates to an enthalpy recovery fuel cell system.

BACKGROUND OF THE INVENTION

A fuel cell can convert chemical energy to electrical energy by promoting a chemical reaction between two reactant gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each reactant flow field plate has an inlet region, an outlet region and open-faced channels connecting the inlet region to the outlet region and providing a way for distributing the reactant gases to the membrane electrode assembly.

The membrane electrode assembly usually includes a solid electrolyte (e.g., a proton exchange membrane) between a first catalyst and a second catalyst. One gas diffusion layer is between the first catalyst and the anode flow field plate, and the other gas diffusion layer is between the second catalyst and the cathode flow field plate.

During operation of the fuel cell, one of the reactant gases (the anode reactant gas) enters the anode flow field plate at the inlet region of the anode flow field plate and flows through the channels of the anode flow field plate toward the outlet region of the anode flow field plate. The other reactant gas (the cathode reactant gas) enters the cathode flow field plate at the inlet region of the cathode flow field plate and flows through the channels of the cathode flow field plate toward the cathode flow field plate outlet region.

As the anode reactant gas flows through the channels of the anode flow field plate, some of the anode reactant gas passes through the anode gas diffusion layer and interacts with the anode catalyst. Similarly, as the cathode reactant gas flows through the channels of the cathode flow field plate, some of the cathode reactant gas passes through the cathode gas diffusion layer and interacts with the cathode catalyst.

The anode catalyst interacts with the anode reactant gas to catalyze the conversion of the anode reactant gas to reaction intermediates. The reaction intermediates include ions and electrons. The cathode catalyst interacts with the cathode reactant gas and the reaction intermediates to catalyze the conversion of the cathode reactant gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and reactant gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode reactant gas undergoes oxidation during the fuel cell reaction. Because electrons are consumed at the cathode side of the membrane electrode assembly, that means the cathode reactant gas undergoes reduction during the fuel cell reaction.

For example, when molecular hydrogen and molecular oxygen are the reactant gases used in a fuel cell, the molecular hydrogen flows through the anode flow field plate and undergoes oxidation. The molecular oxygen flows through the cathode flow field plate and undergoes reduction. The specific reactions that occur in the fuel cell are represented in equations 1–3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 \tfrac{1}{2} O_2 \rightarrow H_2O \tag{3}$$

As shown in equation 1, the molecular hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the molecular oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. Typically, in a fuel cell stack, one side of a flow field plate functions as the anode flow field plate for one fuel cell while the opposite side of the flow field plate functions as the cathode flow field plate in another fuel cell. This arrangement of anode/cathode flow field plates is repeated to provide the reactant flow field plates of the fuel cell stack. The fuel cell stack can further include coolant flow field plates interspersed between the anode and cathode flow field plates.

SUMMARY OF THE INVENTION

The invention relates to an enthalpy recovery fuel cell system.

The fuel cell system is designed so that water vapor leaving the fuel cell in the cathode gas (e.g., oxidant gas) output stream is transferred to the cathode gas input stream. This can decrease the amount of water that is added to the fuel cell system from an external source relative to an otherwise substantially identical fuel cell system having a design in which the water vapor contained in the cathode gas output stream is not transferred to the cathode gas input stream.

The fuel cell system is also designed so that the dew point of the cathode gas input stream is greater than or about the same as the temperature of the leading edge of the active area of the solid electrolyte (i.e., the first edge of the active area of the solid electrolyte intersected by the cathode gas as it flows through the fuel cell). This can reduce the tendency of the solid electrolyte to dry out at the leading edge of the active area of the fuel cell relative to an otherwise substantially identical fuel cell system having a design in which the dew point of the input cathode gas just prior to entering the fuel cell is less than the temperature of the leading edge of the active region of the fuel cell.

In addition, the system can be designed so that the temperature differential across the fuel cell matches the difference between the dew point of the cathode gas input stream and the dew point of the cathode gas output stream (e.g., by using a coolant system which controls the mass flow rate and/or temperature of coolant flowing through the fuel cell). This matching increases the efficiency of water transfer from the cathode gas output stream to the cathode gas input stream relative to a fuel cell system having an otherwise substantially identical design in which the dew point differential between the cathode gas just before it enters the fuel cell and the cathode gas just after it exits the fuel cell is not about the same as the temperature differential across the active area of the fuel cell.

Other advantages, such as increased fuel cell system efficiency, can be achieved according to different embodiments of the invention.

In general, one aspect of the invention is a fuel cell system which includes a fuel cell and an enthalpy recovery device. The fuel cell includes a cathode flow field plate, an anode flow field plate, a coolant flow field plate and a solid electrolyte between the cathode and anode flow field plates. The cathode flow field plate has an inlet, an outlet, and a flow path from its inlet to its outlet. The coolant flow field plate also has an inlet, an outlet, and a flow path from its inlet to its outlet. The solid electrolyte has an active area. The cathode flow field plate flow path has a first region which corresponds to the region along the cathode flow field plate flow path that is closest to the cathode flow field plate inlet and that intersects (i.e., projects onto) the solid electrolyte active area. The coolant flow field plate flow path also has a first region which corresponds to the region along the coolant flow field plate flow path that is closest to the coolant flow field plate inlet and that intersects the solid electrolyte active area. The first region of the cathode flow field plate flow path is substantially the same as the first region of the coolant flow field plate flow path. The enthalpy recovery device has a first side in fluid communication with the cathode flow field plate outlet, and a second side in fluid communication with the cathode flow field plate inlet.

The fuel cell system can also include a first catalyst between the cathode flow field plate and the solid electrolyte, a second catalyst between the anode flow field plate and the solid electrolyte, a first gas diffusion layer between the first catalyst and the cathode flow field plate, and a second gas diffusion layer between the second catalyst and the anode flow field plate.

The fuel cell device can further include a coolant system including a feedback device, a variable speed pump and/or a variable speed fan. The pump outlet is in fluid communication with the coolant flow field plate inlet, and the pump inlet is in fluid communication with the coolant flow field plate outlet. The coolant system can further include temperature sensors in electrical communication with Lthe feedback device to monitor the inlet and outlet temperatures of a coolant flowingalong the coolant flow path and of a reactant gas flowing along the cathode flow field plate flow path, and to adjust the pump speed and/or the fan speed to adjust the inlet and outlet temperatures of the coolant. In this manner, the feedback device can set the temperature of the coolant at the coolant flow field plate inlet and the coolant flow field plate outlet so that the difference between these temperatures is about the same as the difference between the dew points of the cathode gas (e.g., oxidant gas) entering the fuel cell and the cathode gas (e.g., oxidant gas) exiting the fuel cell.

The fuel cell system can also include a liquid water separator with an inlet that is in fluid communication with the cathode flow field plate outlet and an outlet that is in fluid communication with the first side of the enthalpy recovery device. The liquid water separator includes an additional outlet through which liquid water can be removed from the cathode gas exiting the fuel cell.

The net flow direction of the cathode flow field plate flow path can be in a direction that is opposite (antiparallel) to the net flow direction of the anode flow field plate flow path (i.e., countercurrent flow between the cathode gas and the anode gas). The coolant flow field plate flow path can be generally parallel to the cathode flow field plate flow path (i.e., concurrent flow between the cathode gas and the coolant).

In general, another aspect of the invention is a method of operating a fuel cell system. The method includes introducing an oxidant gas stream and a coolant stream into the fuel cell. Upon introduction into the fuel cell, the dew point of the oxidant gas stream is greater than or about the same as the temperature of the coolant stream. The method also includes flowing the oxidant gas stream through the fuel cell along a flow path to an oxidant gas stream outlet, and flowing the coolant stream through the fuel cell along a different flow path. The method further includes reacting molecular oxygen contained in the oxidant gas stream with molecular hydrogen in the fuel cell to form a humidified oxidant gas output stream. In addition, the method includes outputting the humidified oxidant gas output stream from the oxidant gas stream outlet, and transferring water vapor from the humidified oxidant gas output stream to a dry oxidant gas stream to form a humidified oxidant gas input stream.

In general, a further aspect of the invention is a method of operating a fuel cell system which includes a fuel cell having a solid electrolyte with an active area. The method includes flowing an oxidant gas stream through the fuel cell along a flow path which has a first region that intersects the solid electrolyte active area at a region closest to a cathode inlet along the cathode flow path. The method also includes flowing a coolant through the fuel cell along a different flow path which has a first region that intersects the solid electrolyte active area at a region closest to the coolant inlet along a coolant flow path. The temperature of the coolant at the first region of the coolant flow path is less than or about the same as the dew point of the oxidant gas stream at the first region of the oxidant gas stream flow path. The method further includes outputting the oxidant gas stream from the fuel cell, transferring water vapor from the oxidant gas output stream to a dry oxidant gas stream to form a humidified oxidant gas stream input stream.

Other advantages and features will become apparent from the following description of the preferred embodiments and the claims.

DETAILED DESCRIPTION

Figure 1:
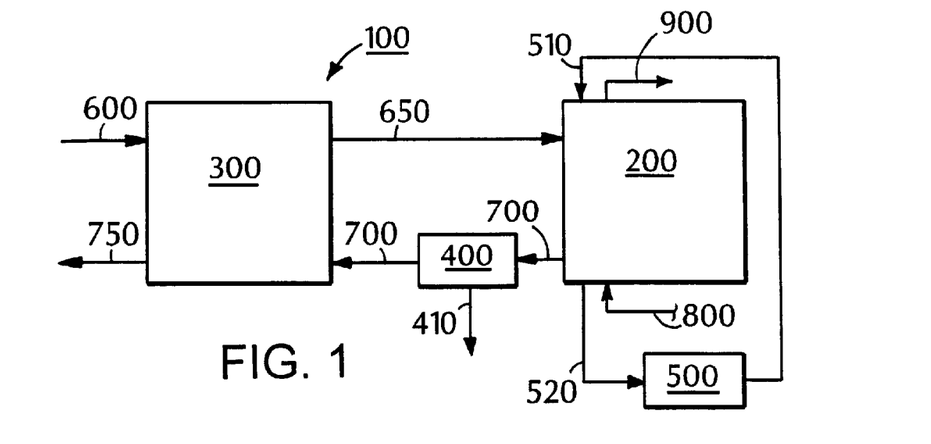
FIG. 1 is a block diagram of a fuel cell system according to an embodiment of the invention.

FIG. 1 shows an embodiment of the invention in which a fuel cell system 100 includes a fuel cell 200, an enthalpy wheel 300, a liquid water separator 400 with a liquid outlet 410, and a coolant system 500 having a coolant stream inlet 510 and a coolant stream outlet 520. Fuel cell system 100 also includes a dry oxidant gas input stream 600, a humidified oxidant gas input stream 650, a humidified oxidant gas output stream 700, a dry oxidant gas output stream 750, a fuel gas input stream 800 and a fuel gas output stream 900.

During operation of fuel cell 200, molecular hydrogen and molecular oxygen contained in streams 800 and 650, respectively, flow through fuel cell 200 and react to produce electricity, heat and water. The water produced during the fuel cell reaction is removed from fuel cell 200 in streams 700 and 900 in the form of water vapor and liquid water.

The liquid water contained in stream 700 is removed by passing the stream through liquid separator 400. In one embodiment, liquid separator 400 is a vessel. Generally, the vessel operates by reducing the velocity of the flow rate of stream 700 to allow for gravity separation of the liquids and gases contained in stream 700. Liquid water can exit separator 400 via outlet 410, while gas stream 700 can continue to enthalpy wheel 300. Other examples of liquid separators include centrifugal separators and wicking separators.

Water vapor contained in stream 700 is removed by flowing the stream through enthalpy wheel 300 which transfers water vapor from stream 700, which has a relatively high dew point, to stream 600, which has a relatively low dew point. The water transfer from stream 700 to stream 600 forms humidified oxidant gas input stream 650 and dry oxidant gas output stream 750. Enthalpy wheel 300 operates by transferring sensible heat and latent heat contained in the water vapor of humidified output stream 700 to dry oxidant input stream 600, thereby forming humidified oxidant input stream 650. Enthalpy wheel 300 is rotationally driven and is formed of a material (e.g., acrylic fiber) which is chemically resistant to de-ionized water. The material is coated with zeolite, which acts as a water-selective molecular sieve. The mass of enthalpy wheel 300 transfers sensible heat from stream 700 to stream 600. The zeolite traps and transfers water, and therefore latent heat, from stream 700 to stream 600. Enthalpy wheels are commercially available from, for example, Engelhardt Corp., LaRoche Air Systems, Inc. and Emprise Corp.

The size of enthalpy wheel 300 is determined by operating fuel cell 200 at a flow rate of reactant gases in streams 650 and 800 which corresponds to a predetermined maximum flow rate that will be used during operation of fuel cell 200 and measuring the difference in the dew point between streams 650 and 700. Enthalpy wheel 300 should be large enough so that, at this maximum predetermined reactant gas flow rate, the difference between the dew point of stream 700 and the dew point of stream 650 is less than about 8° C. (e.g., less than about 5° C. or less than about 3° C.).

An enthalpy wheel having a diameter of about 6 inches and a length of about 7.4 inches has been found to result in a dew point of 70° C. for stream 700 and a dew point of 65° C. for stream 650 when operating a fuel cell at a reactant gas flow rate through stream 650 of about 20 cubic feet per minute. This reactant gas flow rate provides a fuel cell power output of about 7 kW. Using this enthalpy wheel results in the same dew points of 65° C. and of 70° C. for stream 650 and 700, respectively, when the fuel cell is operated at a reactant gas flow rate of about 5 cubic feet per minute. This reactant gas flow rate provides a fuel cell power output of about 2 kW.

While the use of an enthalpy wheel as an enthalpy recovery device has been described, the invention is not limited to the use of an enthalpy wheel. Other enthalpy recovery devices can be used, including, for example, a substantially gas impermeable, water permeable membrane, such as disclosed in GB 2,139,110, which is hereby incorporated by reference. These membranes operate by flowing gas stream 700 on one side of the membrane and gas stream 600 on the other side of the membrane. The water vapor in stream 700, as well as the latent heat and sensible heat contained therein, passes through the membrane, but the membrane blocks substantially all of the other gases from passing therethrough. The membranes are commercially available from, for example, Pall Corp. (e.g., flat sheet membranes), Isotronics Corp. (e.g., tube-like membrane dryers) and W. L. Gore & Associates (e.g., flat sheet membranes).

In some embodiments, a desiccant wheel or cassette can be used as the enthalpy recovery device. Generally, such a device is designed to be reactivated by heat (e.g., electric heat, steam heat or waste heat). The device turns relatively slowly (e.g., 0.33 revolutions per minute) and is relatively heavily loaded with a desiccant material (e.g., compared to certain enthalpy wheels) that has a relatively high affinity for water vapor. Typically, the moisture content of such a device depends upon the relative humidity of the surrounding air. One type of desiccant wheel or cassette uses an absorbent (e.g., lithium chloride) which can undergo a chemical change as it attracts and retains water vapor. Another type of desiccant wheel or cassette uses an adsorbent having pores at its surface which can hold water vapor.

In certain embodiments, the enthalpy recovery device can be a sensible heat rotor. Generally, sensible heat rotors recovery primarily thermal heat (e.g., only thermal heat). A sensible heat rotor can be used in combination with, for example, a desiccant wheel so that the sensible heat rotor can further reduce the temperature of humidified oxidant gas output stream 700 which can allow additional condensate to drop out of stream 700 (e.g., by first passing stream 700 through a desiccant wheel then a sensible heat rotor).

Various combinations of enthalpy recovery devices can be used.

Figure 2:
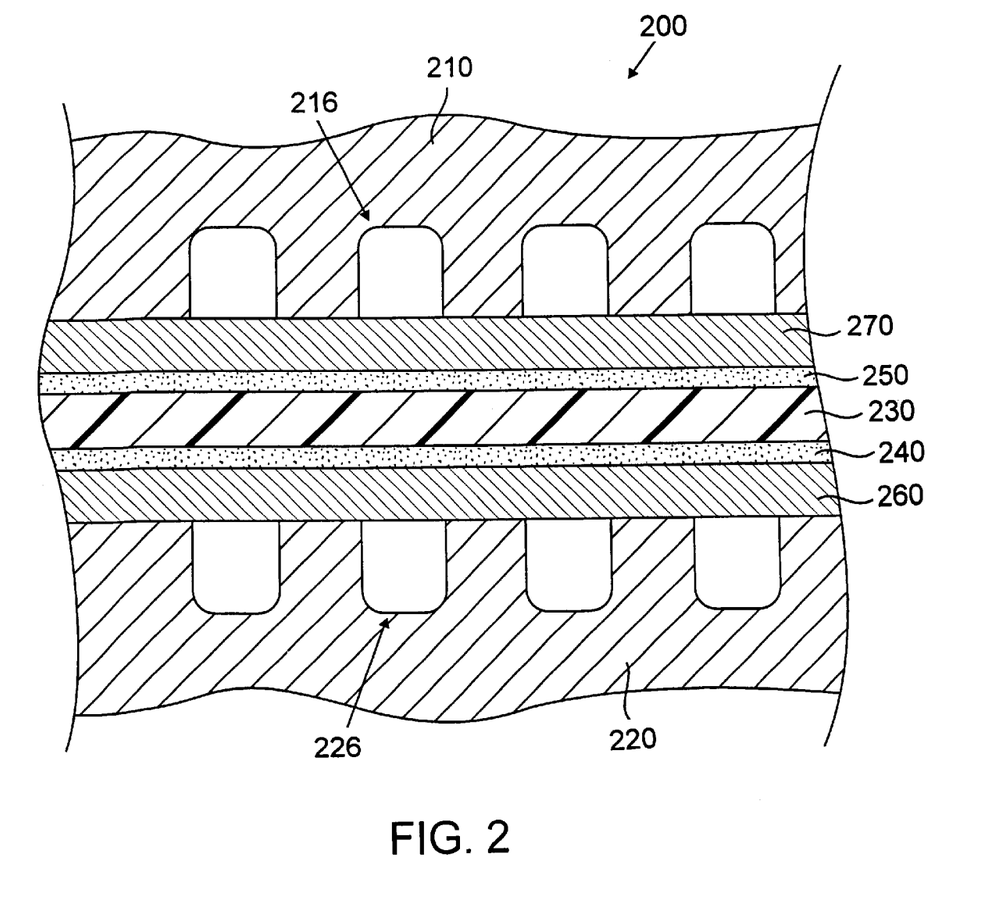
FIG. 2 is a cross-sectional view of a fuel cell according to an embodiment of the invention.
Figure 3:
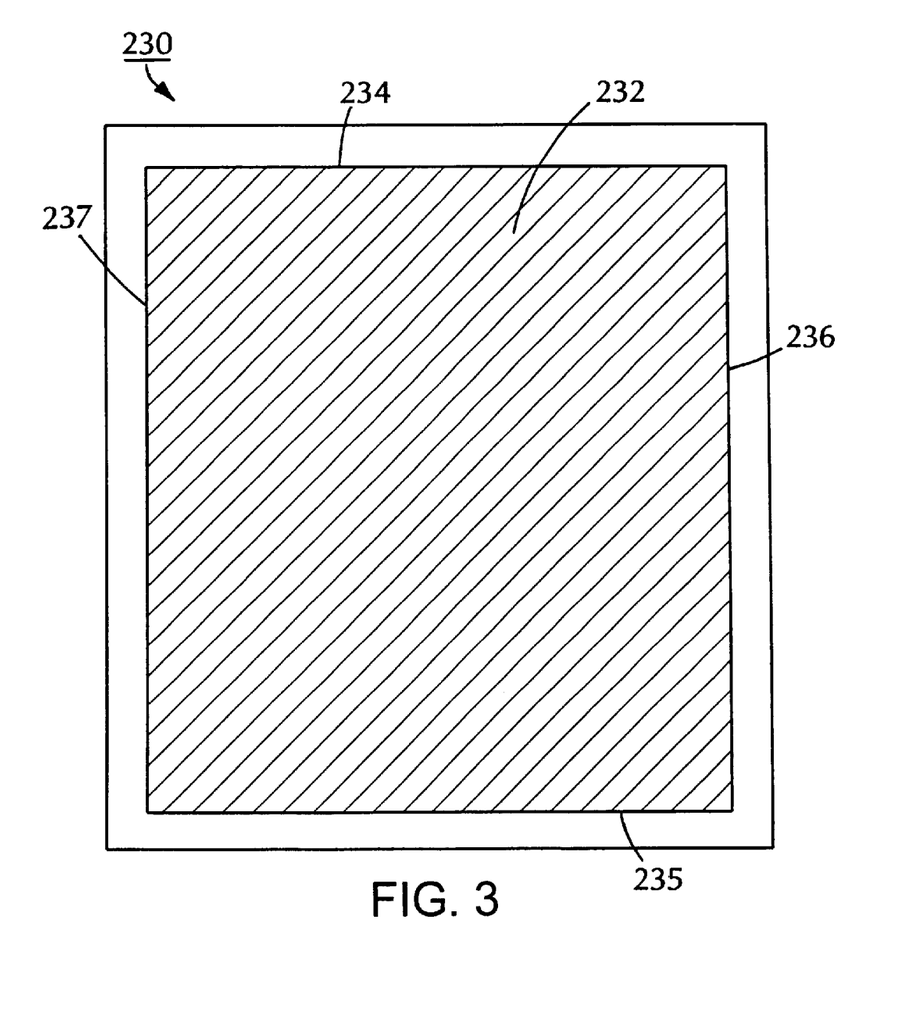
FIG. 3 is an elevational view of a solid electrolyte according to an embodiment of the invention.

FIG. 2 shows an embodiment of fuel cell 200 designed to catalyze the fuel cell reaction. Fuel cell 200 includes a cathode flow field plate 210, an anode flow field plate 220, a solid electrolyte 230, catalysts 240 and 250 and gas diffusion layers 260 and 270. As shown in FIGS. 2 and 3, fuel cell 200 has an active area (i.e., an area where the fuel cell reaction occurs) represented by area 232 of solid electrolyte 230. Active area 232 is defined by edges 234, 235, 236 and 237 and corresponds to the area of solid electrolyte 230 between gas diffusion layers 260 and 270.

Electrolyte 230 should be capable of allowing ions to flow therethrough while providing a substantial resistance to the flow of electrons. Electrolyte 230 is a solid polymer (e.g., a solid polymer ion exchange membrane), such as a solid polymer proton exchange membrane (e.g., a solid polymer containing sulfonic acid groups). Such membranes are commercially available from E. I. DuPont de Nemours Company (Wilmington, Del., under the trademark NAFION® polymer material. Alternatively, electrolyte 230 can also be prepared from the commercial product GORE-SELECT® polymer material, available from W. L. Gore & Associates (Elkton, Md.).

Catalyst 240 can be formed of a material capable of interacting with molecular hydrogen to form protons and electrons. Examples of such materials include, for example, platinum, platinum alloys, and platinum dispersed on carbon black. The catalytic material can be dispersed in one or more solvents (e.g., isopropanol) to form a suspension. The suspension is then applied to the surfaces of solid electrolyte 230 that face gas diffusion layers 260 and 270, and the suspension is then dried. Alternatively, the suspension is applied to the surfaces of gas diffusion layers 260 and 270 that solid electrolyte 230, respectively, and the suspension is then dried. The method of preparing catalyst 240 may further include the use of heat and temperature to achieve bonding.

Catalyst 250 can be formed of a material capable of interacting with molecular oxygen, electrons and protons to form water. Examples of such materials include, for example, platinum, platinum alloys, and noble metals dispersed on carbon black. Catalyst 250 can be prepared as described above with respect to catalyst 240.

Gas diffusion layers 260 and 270 are formed of a material that is both gas and liquid permeable material so that the reactant gases (e.g., molecular hydrogen and molecular oxygen) and products (e.g., water) can pass therethrough. In addition, layers 260 and 270 should be electrically conductive so that electrons can flow from catalyst 240 to anode flow field plate 220 and from cathode flow field plate 210 to catalyst 250. Such materials are formed by infusing a porous carbon black cloth or paper with a slurry of carbon black followed by sintering with TEFLON® polytetrafluoroethylene.

Figure 4:
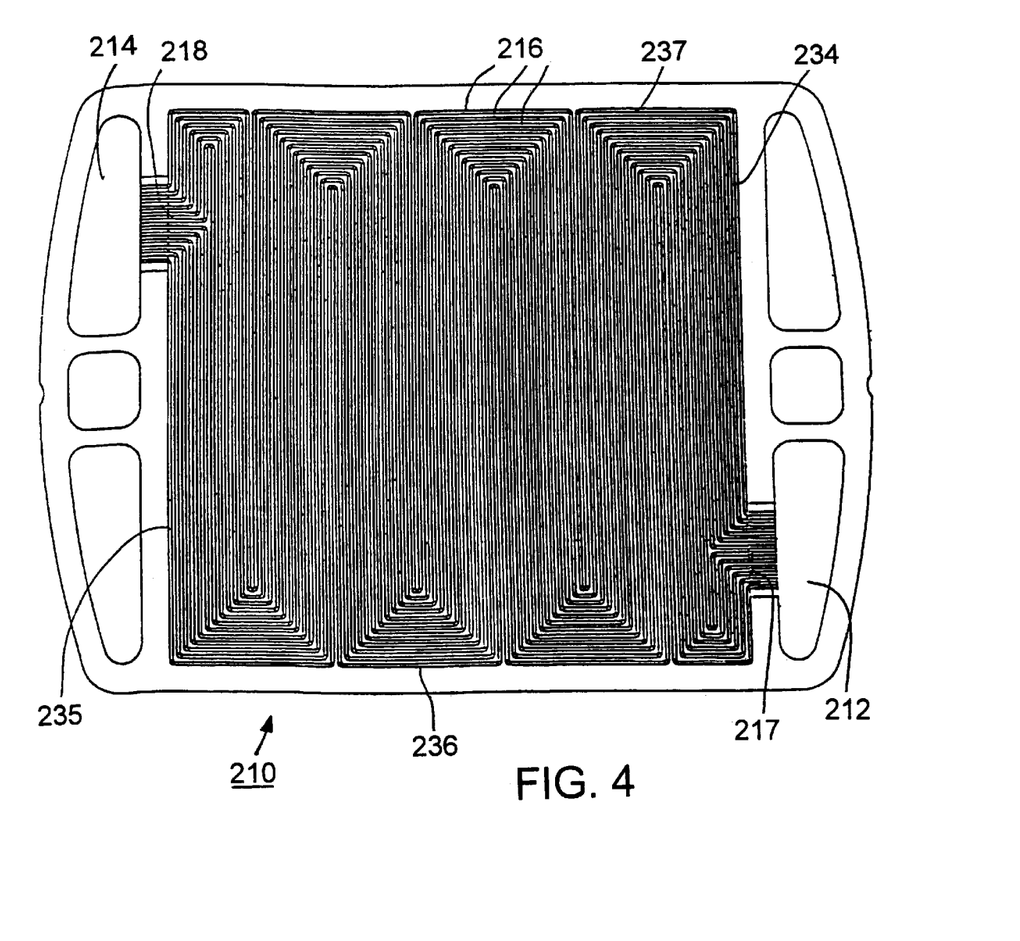
FIG. 4 is an elevational view of a cathode flow field plate according to an embodiment of the invention.

FIGS. 2 and 4 show an embodiment of cathode flow field plate 210 which is used to provide a flow path that allows the molecular oxygen to interact with catalyst 250. Cathode 210 has an inlet 212, an outlet 214 and open-faced channels 216 that define a flow path for an oxidant gas from inlet 212 to outlet 214. A projection of active area 232 of solid electrolyte 230 onto cathode flow field plate 210 corresponds to the serpentine portion of open-faced channels 216. The flow path first intersects (i.e., projects onto) active area 232 at a region 217 of the flow path where the oxidant gas passes over edge 234, and last intersects active area 232 at a region 218 of the flow path where the oxidant gas passes over edge 235. The net thermal flow direction of the cathode flow field plate flow path across active area 232 is shown by the arrow. Between entrance region 217 and exit region 218, the molecular oxygen contained in the oxidant gas permeates gas diffusion layer 270 to interact with catalyst 250, electrons and protons to form water. The water can pass back through diffusion layer 270, enter the oxidant stream in channels 216, and exit fuel cell 200 through cathode flow field plate outlet 214.

Figure 5:
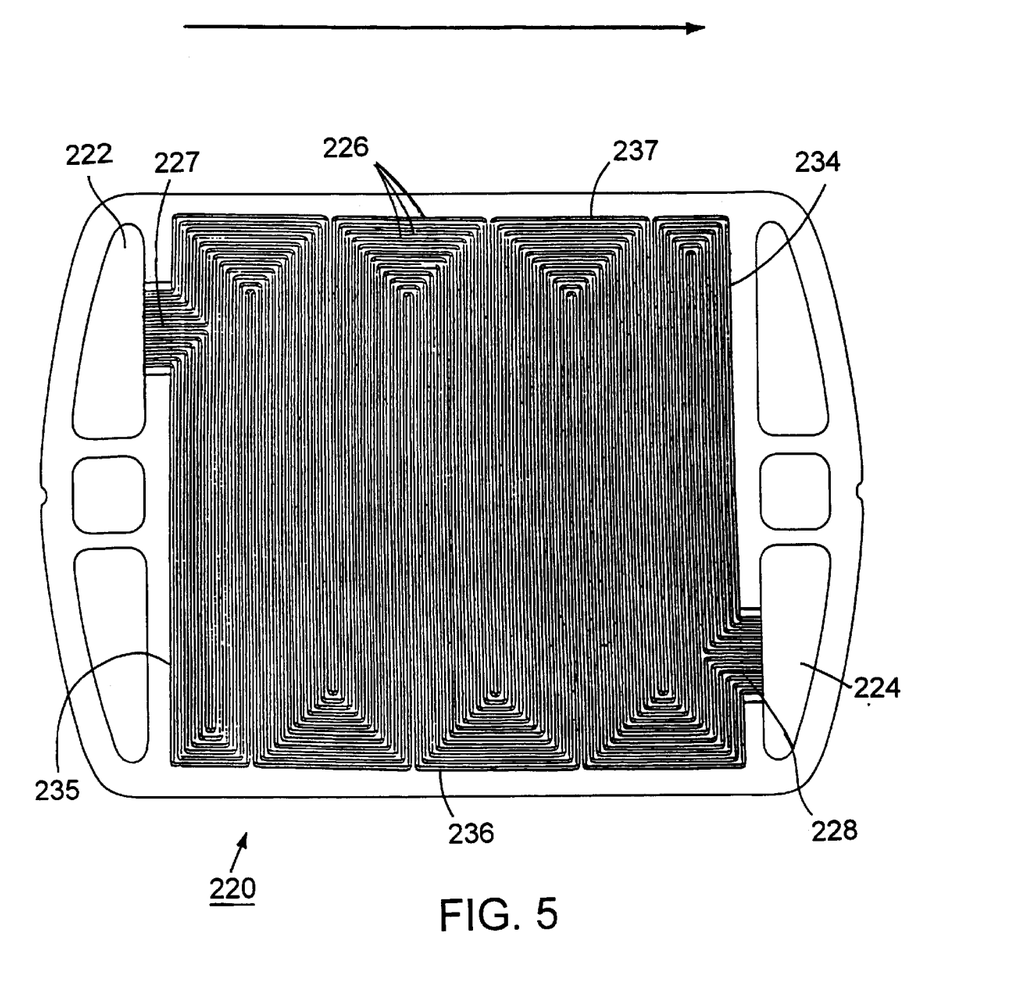
FIG. 5 is an elevational view of an anode flow field plate according to an embodiment of the invention.

FIGS. 2 and 5 show an embodiment of anode 220 which is designed to provide a flow path for a fuel gas that allows the molecular hydrogen to interact with catalyst 240. Anode flow field plate 220 has an inlet 222, outlet 224 and open-faced channels 226 that define a flow path for a fuel gas from inlet 222 to outlet 224. A projection of active area 232 of solid electrolyte 230 onto anode flow field plate 220 corresponds to the serpentine portion of open-faced channels 226. The flow path first intersects active area 232 on anode flow field plate 220 at a region 227 of the flow path where the fuel gas passes over edge 235, and last intersects active area 232 at a region 228 of the flow path where the fuel gas passes over edge 234. The net thermal flow direction of the anode flow field plate flow path across active area 232 is shown by the arrow. Thus, the net thermal flow direction of the anode flow field plate flow path across active area 232 is antiparallel to the net thermal flow direction of the cathode flow field plate flow path across active area 232 (i.e., the net thermal flow of oxidant gas across active area 232 is counter to the net thermal flow of fuel gas across active area 232). Because the temperature of fuel gas input stream 800 is higher than the dew point of humidified oxidant gas input stream 650, this arrangement of the cathode and anode flow field plate flow paths reduces the tendency of the fuel stream to increase the temperature of edge 234 of solid electrolyte 230, thereby reducing the tendency of edge 237 to dehydrate due to the oxidant gas to absorbing water from edge 237.

In some embodiments, cathode flow field plate 210 and anode flow field plate 220 can be arranged so that the net thermal flow of the oxidant gas across active area 232 is not counter to the net thermal flow of fuel gas across active area 232.

Along the anode flow field plate flow path between entrance region 227 and exit region 228, the molecular hydrogen contained in the fuel gas permeates gas diffusion layer 260 to interact with catalyst 240 to form protons and electrons. The protons pass through solid electrolyte 230, and the electrons pass are conducted through gas diffusion layer 260 to anode flow field plate 220, ultimately flowing through an external load to cathode flow field plate 210.

Figure 6:
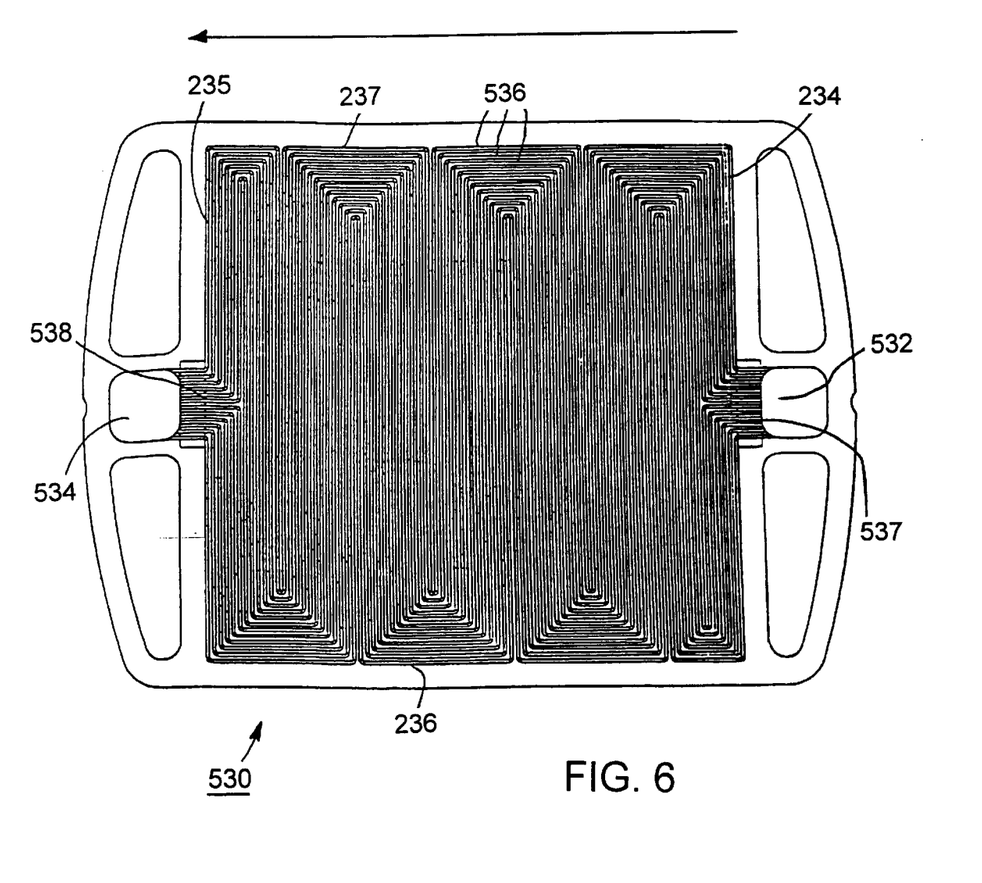
FIG. 6 is an elevational view of a coolant flow field plate according to an embodiment of the invention

The heat produced during the fuel cell reaction is removed from fuel cell 200 by flowing a coolant through the fuel cell via a coolant flow field plate. FIG. 6 shows an embodiment of coolant flow field plate 530 having an inlet 532, an outlet 534 and open-faced channels 536 that define a flow path for coolant from inlet 532 to outlet 534. A projection of active area 232 of solid electrolyte 230 onto coolant flow field plate 530 corresponds to the serpentine portion of open-faced channels 536. The flow path first intersects active area 232 on coolant flow field plate 530 at a region 537 of the flow path where the coolant passes over edge 234, and last intersects active area 232 at a region 538 of the flow path where the coolant passes over edge 235. The net thermal flow direction of the anode flow field plate flow path across active area 232 is shown by the arrow. The flow field of coolant flow field plate 530 is generally parallel to the flow field for both cathode flow field plate 210 (i.e., the net thermal flow of oxidant gas across active area 232 is concurrent with the net thermal flow of coolant across active area 232). Thus, the first and last points of intersection with active area 232 of solid electrolyte 230 are substantially the same for the cathode flow field plate flow path and the coolant flow field plate flow path (i.e., sufficiently close so that region 217 is substantially the same temperature as region 537 and region 218 is substantially the same temperature as region 538 during operation of fuel cell 200 when the fuel cell reaction is occurring and coolant is flowing through coolant flow field plate 530). With this arrangement, the temperature of edge 234 of solid electrolyte 230 (i.e., the first portion of the cathode flow field plate flow path that intersects active area 232 of solid electrolyte 230) can be set so that it is less than or about the same as (e.g., within about 0.8° C., such as within about 0.5° C. or within about 0.3° C. of) the dew point of the oxidant gas at edge 237. This reduces the tendency for edge 237 to become dehydrated due to water absorption by the oxidant gas from edge 237. In addition, the net thermal flow direction of the coolant flow field plate flow path across active area 232 is parallel to the net thermal flow direction of the cathode flow field plate flow path across active area 232.

In some embodiments, cathode flow field plate 210 and coolant flow field plate 530 can be arranged so that the net thermal flow of the oxidant gas across active area 232 is not concurrent with the net thermal flow of coolant across active area 232.

Figure 7:
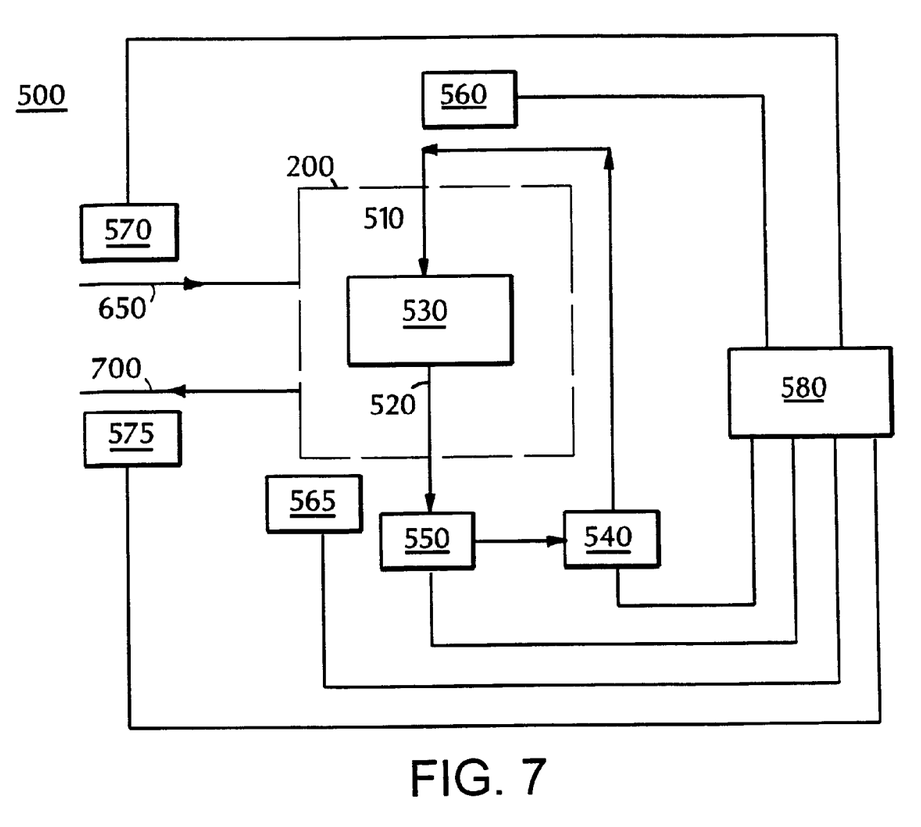
FIG. 7 is a block diagram of a coolant system according to an embodiment of the invention.

Referring to FIG. 7, a coolant system 500 controls the mass flow rate and temperature of coolant flowing through coolant flow field plate 530 and thereby controls the temperature gradient across coolant flow field plate 530 from coolant flow field plate inlet 532 to coolant flow field plate outlet 534. Coolant system 500 includes a coolant input stream 510, coolant output stream 520, a variable speed fan 540, a pump (e.g., a constant speed pump or a variable speed pump) 550, a coolant stream input temperature sensor 560, a coolant stream output temperature sensor 565, an oxidant gas input stream dew point sensor 570, an oxidant gas output stream dew point sensor 575, and a feedback device 580.

Feedback device 580 is electrically connected to fan 540, pump 550 and sensors 560, 565, 570 and 575. Device 580 senses the dew point of streams 650 and 700 using sensors 570 and 575, respectively, and the temperature of streams 510 and 520 using sensors 560 and 565, respectively. Device 580 then sets the speed of fan 540 and/or the speed of pump 550 to control the temperature and/or mass flow rate of the coolant (e.g., de-ionized water or a low freezing temperature fluid, such as a hydrocarbon oil or a silicone oil) flowing in stream 510 so that the dew point of stream 650 is greater than or about the same as (e.g., within about 0.8° C., such as within about 0.5° C. or within about 0.3° C. of) the temperature of stream 510, and the dew point of stream 700 is about the same as the temperature of stream 520 (e.g., within about 0.8° C., such as within about 0.5° C. or within about 0.3° C.). This results in the temperature differential between streams 510 and 520 being about the same as (e.g., within about 0.5° C., such as within about 0.2° C. or within about 0.1° C. of) the difference in the dew points of streams 650 and 700, which optimizes the efficiency with which enthalpy wheel 300 transfers water from stream 700 to stream 600.

Although certain embodiments and arrangements of cathode flow field plate 210, anode flow field plate 220 and coolant flow field plate 530 have been described herein, other embodiments and arrangements of these flow field plates can also be used so long as the temperature matching properties described above are achieved. For example, other embodiments are disclosed in commonly assigned U.S. patent application Ser. No. 09/168,232, entitled "Fuel Cell Assembly Unit for Promoting Fluid Service and Design Flexibility", now U.S. Pat. No. 6,015,633, which is hereby incorporated by reference.

Moreover, while a fuel cell system containing a single fuel cell has been described herein, the fuel cell system is not limited to such systems. Rather, the fuel cell system can include a plurality of fuel cells. Typically, the fuel cells in such systems are arranged in series by having the back side of a cathode flow field plate in one fuel cell serve as the anode flow field plate in the next fuel cell in the series arrangement. A plurality of coolant flow field plates can also be used in these systems. Examples of fuel cell systems having a plurality of fuel cells and coolant flow field plates are described in U.S. patent application Ser. No. 09/168,232.

While certain embodiments of the invention, as well as their principals of operation, have been disclosed herein, the invention is not limited to these embodiments or these principals of operation. Other embodiments are in the claims.

What is claimed is:

1. A fuel cell system, comprising:
   a fuel cell, comprising:
   a cathode flow field plate having an inlet, an outlet, and a cathode flow path from the cathode flow field plate inlet to the cathode flow field plate outlet, the cathode flow path having a net flow direction;
   an anode flow field plate;
   a coolant flow field plate having an inlet, an outlet, and a coolant flow path from the coolant flow field plate inlet to the coolant flow field plate outlet, the coolant flow path having a net flow direction; and
   a solid electrolyte between the cathode and anode flow field plates, the solid electrolyte having an active area;
   an enthalpy recovery device having a first side and a second side different than the first side, the first side of the enthalpy recovery device being in fluid communication with the cathode flow field plate outlet, and the second side of the enthalpy recovery device being in fluid communication with the cathode flow field plate inlet and
   a coolant system, comprising:
   a feedback device; and
   a variable speed pump having a pump speed a pump inlet and a pump outlet in fluid communication with the pump inlet, the pump inlet being in fluid communication with the coolant flow field plate outlet, and the pump outlet being in fluid communication with the coolant flow field plate inlet, the feedback device being in electrical communication with the variable speed pump to control the pump speed,
   wherein the net flow direction of the cathode flow path is concurrent with the net flow direction of the coolant flow path.

2. The fuel cell system of claim 1, wherein the coolant system further comprises:
   a first temperature sensor in thermal communication with the coolant flow field plate inlet and in electrical communication with the feedback device; and
   a second temperature sensor in thermal communication with the coolant flow field plate outlet and in electrical communication with the feedback device.

3. The fuel cell device of claims, wherein the coolant system further comprises:

a third temperature sensor in thermal communication with the cathode flow field plate inlet and in electrical communication with the feedback device; and a fourth temperature sensor in thermal communication with the cathode flow field plate outlet and in electrical communication with the feedback device.

4. The fuel cell system of claim 3, wherein the coolant system further comprises a variable speed fan having a fan speed, the variable speed fan being in electrical communication with the feedback device so that the feedback device controls the fan speed.

5. The fuel cell system of claim 4, wherein the first temperature sensor provides a signal to the feedback device that corresponds to a temperature of a coolant present at the coolant inlet, the second temperature sensor provides a signal to the feedback device that corresponds to a temperature of a coolant present at the coolant outlet, the thrid temperature sensor provides a signal to the feedback device that corresponds to a dew point of a gas present at the cathode inlet, and the fourth temperature sensor provides a signal to the feedback device that corresponds to a dew point of a gas present at the cathode outlet, and wheren the feedback device uses the signals of the first, second, thrid and fourth temperature sensors to control the fan speed of the variable speed fan so that the dew point of the gas present at the cathode flow field plate inlet is at least about 0.8° C. greater than the temperature of the coolant present at the coolant flow field plate inlet, and so that the dew point of the gas present at the first region of the cathode flow field plate outlet is within about 0.8° C. of the temperature of the coolant present at the coolant flow field plate outlet.

6. The fuel cell system of claim further comprising a liquid water separator having a separator inlet, a first separator outlet and a second separator outlet different than the first separator outlet, the separator inlet being in fluid communication with the cathode flow field plate outlet, the first separator outlet being in fluid communication with the first side of the enthalpy recovery device, and the second separator outlet being capable of transporting liquid water from the liquid water separator.

7. The fuel cell system of claim 1, wherein the enthalpy recovery device comprises an enthalpy wheel.

8. The fuel cell system of claim 1, wherein the enthalpy recovery device comprises a membrane.

9. The fuel cell system of claim 1, wherein the anode flow field plate has an inlet, an outlet, and an anode flow path from the anode flow field plate inlet to the anode flow field plate outlet, the anode flow path having a net flow direction, and wherein the net flow direction of the cathode flow path is counter to the net flow direction of the anode flow path.

10. The fuel cell of claim 1, wherein the solid electrolyte comprises a proton exchange membrane.

11. The fuel cell system of claim 1, wheren the cathode flow path first intersects the active area of the solid electrolyte at a first cathode region, the coolant flow path first intersects the active area of the solid electrolyte at a first coolant region, and the first cathode region and the first coolant region are arranged so that during operation of the fuel cell system a dew point of a gas present at the first cathode region is within about 0.8° C. of a temperature of a coolant present at the first coolant region.

12. The fuel cell system of claim 1, wherein the solid electrolyte has an edge and both the cathode flow path and the anode flow path first intersect the solid electrolyte at the edge.

13. The fuel cell system of claim 1, wherein the anode flow field plate has an inlet, an outlet, and an anode flow path from the anode flow field plate inlet to the anode flow field plate outlet, the anode flow path having a net flow direction, the net flow directino of the cathode flow path being concurrent with the net flow direction of the anode flow path.

14. A method of operating a fuel cell system, comprising:
introducing an oxidant gas stream into the fuel cell, the oxidant gas stream having a dew point at introduction into the fuel cell;
introducing a coolant stream into the fuel cell, the coolant stream having a temperature at introduction into the fuel cell that is within about 0.8° C. of the dew point of the oxidant gas stream;
flowing the oxidant gas stream through the fuel cell along an oxidant gas stream flow path to an oxidant gas stream outlet;
flowing the coolant stream through the fuel cell along a coolant stream flow path;
reacting molecular oxygen contained in the oxidant gas stream with molecular hydrogen in the fuel cell to form a humidified oxidant gas output stream;
outputting the humidified oxidant gas output stream from the oxidant gas stream outlet; and
transferring water vapor from the humidified oxidant gas output stream to a dry oxidant gas stream to form a humidified oxidant gas input stream.

15. The method of claim 14, further comprising introducing the humidified oxidant gas input stream to the fuel cell.

16. The method of claim 15, wherein the humidified oxidant gas input stream has a dew point at introduction into the fuel cell that is about the same as the temperature of the coolant stream at introduction into the fuel cell.

17. The method of claim 14, wherein the water vapor is transferred from the humidified oxidant gas output stream to the dry oxidant gas stream by flowing the humidified oxidant output gas stream through an enthalpy recovery device.

18. The method of claim 14, further comprising outputting the coolant stream from the fuel cell, the coolant stream having a temperature at output from the fuel cell that is about the same as a temperature of the humidified oxidant output gas stream at output from the fuel cell.

19. The method of claim 18, further comprising introducing the humidified oxidant gas input stream to the fuel cell, the humidified oxidant gas input stream having a temperature at introduction into the fuel cell that is about the same as the temperature of the coolant stream at introduction into the fuel cell.

20. The method of claim 14, further comprising:
outputting the coolant stream from the fuel cell; and
adjusting a mass flow rate of the coolant stream to set a difference between the coolant stream temperature at introduction into the fuel cell and a coolant stream temperature at output from the fuel cell.

21. The method of claim 20, wherein the coolant stream temperature at output from the fuel cell is about the same as a temperature of the humidified oxidant gas output stream at output from the fuel cell.

22. The method of claim 14, wherein the temperature of the coolant at the first region of the coolant flow path that is within about 0.5° C. of the dew point of the oxidant gas stream at the first region of the oxidant gas stream flow path.

23. The method of claim 14, wherein the temperature of the coolant at the first region of the coolant flow path that is within about 0.3° C. of the dew point of the oxidant gas stream at the first region of the oxidant gas stream flow path.

24. A method of operating a fuel cell system including a fuel cell having a solid electrolyte with an active area, the method comprising:

flowing an oxidant gas stream through the fuel cell along an oxidant gas stream flow path having a first region that intersects the solid electrolyte active area at a region closest to a cathode inlet along the cathode flow path, the oxidant gas stream having a dew point at the first region of the oxidant gas stream flow path;

flowing a coolant through the fuel cell along a coolant flow path havng a first region that intersects the solid electrolyte active area at a region closest to the coolant inlet along a coolant flow path, the coolant having a temperature at the first region of the coolant flow path that is within about 0.8° C. of the dew point of the oxidant gas stream at the first region of the oxidant gas stream flow path;

outputting the oxidant gas stream from the fuel cell; and transferring water vapor from the oxidant gas output stream to a dry oxidant gas stream to form a humidified oxidant gas stream input stream.

25. The method of claim 24, wherein the water vapor is transferred from the oxidant gas output stream to the dry oxidant gas stream by flowing the humidified oxidant gas output stream through an enthalpy recovery device.

26. The method of claim 24, further comprising introducing the oxidant gas input stream into the fuel cell.

27. The method of claim 26, wherein a dew point of the oxidant gas input stream at introduction into the fuel cell is about the same as the temperature of the coolant at the first region of the coolant flow path.

28. The method of claim 24, further comprising outputting the coolant from the fuel cell, the coolant having a temperature at output that is about the same as the dew point of the oxidant gas stream upon output from the fuel cell.

29. The method of claim 28, further comprising adjusting a mass flow rate of the coolant stream to set a difference between the coolant stream temperature at introduction into the fuel cell and a coolant stream temperature at output from the fuel cell.

30. The method of claim 29, wherein the coolant stream temperature at output from the fuel cell is about the same as a temperature of the humidified oxidant gas output stream at output from the fuel cell.

31. The method of claim 24, further comprising:

outputting the coolant from the fuel cell; and adjusting a mass flow rate of the coolant stream to set a difference between the coolant stream temperature at introduction into the fuel cell and a coolant stream temperature at output from the fuel cell.

32. The method of claim 31, wherein the coolant stream temperature at output from the fuel cell is about the same as a temperature of the humidified oxidant gas output stream at output from the fuel cell.

33. The method of claim 24, wherein the solid electrolyte comprises a proton exchange membrane.

34. the method of claim 24, wherein the temperature of the coolant at the first region of the coolant flow path that is within about 0.5° C. of the dew point of the oxidant gas stream at the first region of the oxidant gas stream flow path.

35. The method of claim 24, wherein the temperature of the coolant at the first region of the coolant flow path that is within about 0.3° C. of the dew point of the oxidant gas stream at the first region of the oxidant gas stream flow path.

* * * * *